DIGITAL MULTIPLIER
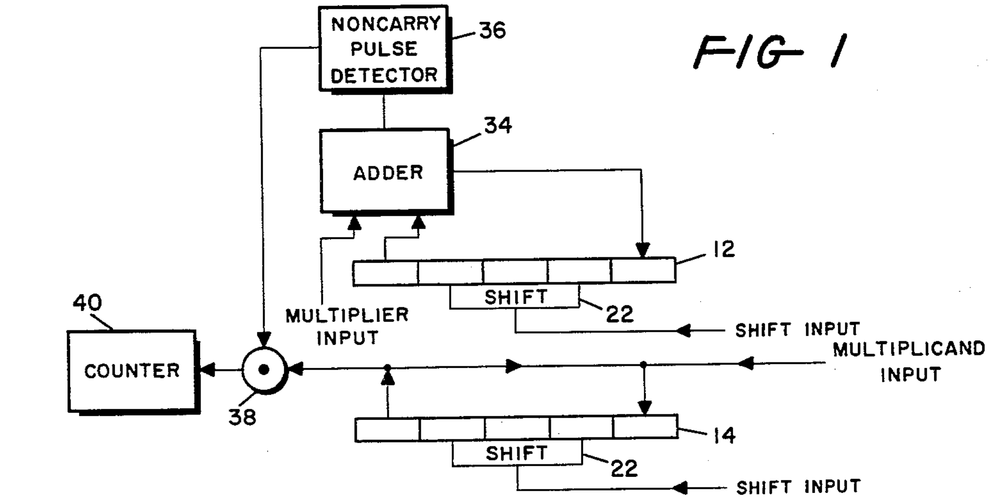
FIG. 1
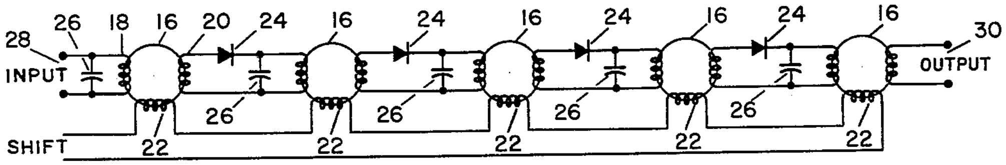
FIG. 2
PULSE OCCURANCE FOR 16 x .625 = 10
| RECIRCULATION | | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|---|
| NONCARRY PULSE | $T_1$ | X | | X | | X | | X | | X | | X | | X | | X | |
| | $T_2$ | | X | | | | X | | | | X | | | | X | | |
| | $T_3$ | | | | X | | | | | | | | X | | | | |
| | $T_4$ | | | | | | | | X | | | | | | | | |
| | $T_5$ | | | | | | | | | | | | | | | | X |
| OUTPUT LINE FOR MULTIPLICAND .625 | | X | | X | X | X | | X | | X | | X | X | X | | X | |
FIG. 4
*INVENTORS*
YU CHI HO
*BY* E. CALVIN JOHNSON
Allen M Krass
AGENT INVENTORS
YU CHI HO
E. CALVIN JOHNSON
BY Allen M Krass
AGENT United States Patent Office 3,006,550 Patented Oct. 31, 1961

3,006,550

DIGITAL MULTIPLIER

Ewell Calvin Johnson and Yu Chi Ho, Royal Oak, Mich., assignors to The Bendix Corporation, a corporation of Delaware Filed Jan. 11, 1957, Ser. No. 633,569
6 Claims. (Cl. 235—165)

This invention relates to electronic circuitry for multiplying two numeric quantities.

Devices and circuits for providing an output quantity which is proportional to the product of two input quantities find frequent use in computers and control systems.

The present invention comprises an electronic multiplier circuit which may receive one input quantity in binary coded form and the other input quantity as a train of pulses of a number which is proportional to the second quantity to be multiplied. The output of the circuit constitutes a second chain of pulses, the number of which is proportional to the product of the first input and the second input.

The pulses in this output train are distributed over a particular output time in a roughly linear fashion. This fact makes the present multiplier of particular value for use in control circuits in which a movement is produced in proportion to a number of pulses. Because of the linear distribution of the pulses along the output train the controlled motion may be carried on at a relatively constant velocity over the time period of the multiplication.

The present multiplier makes use of recirculating registers which have the ability to store information and present it for utilization by the other components of the circuit in a very economical and reliable manner. The use of the recirculating registers allows the multiplier to operate in a serial rather than a parallel fashion and the other circuit components may therefore be utilized on a time sharing basis and may accordingly be reduced in number.

It is an object of the present invention to provide an electronic circuit which will multiply two numbers.

It is a further object of the present invention to provide an electronic circuit which will multiply a number of pulses by a binary number and have as its output a train of pulses which are distributed over the time period of multiplication in a roughly linear manner.

A further object is to provide electronic circuitry for multiplying two quantities which makes use of serial recirculating registers to store the multiplying quantities.

Another object is to provide an electronic multiplier which operates in serial fashion so as to time share many of its components.

Other objects, advantages and applications of the present invention will be made clear by the following detailed description of a particular embodiment of the invention. The description makes reference to the accompanying drawings in which:

FIGURE 1 is a simplified block schematic view of the major components which form the preferred embodiment of the invention;

FIGURE 2 is a schematic drawing of the internal structure of the serial recirculating registers which are employed in the present invention;

FIGURE 4 is a chart indicating the manner of operation of the particular embodiment for a particular multiplication problem.

Figure 3:
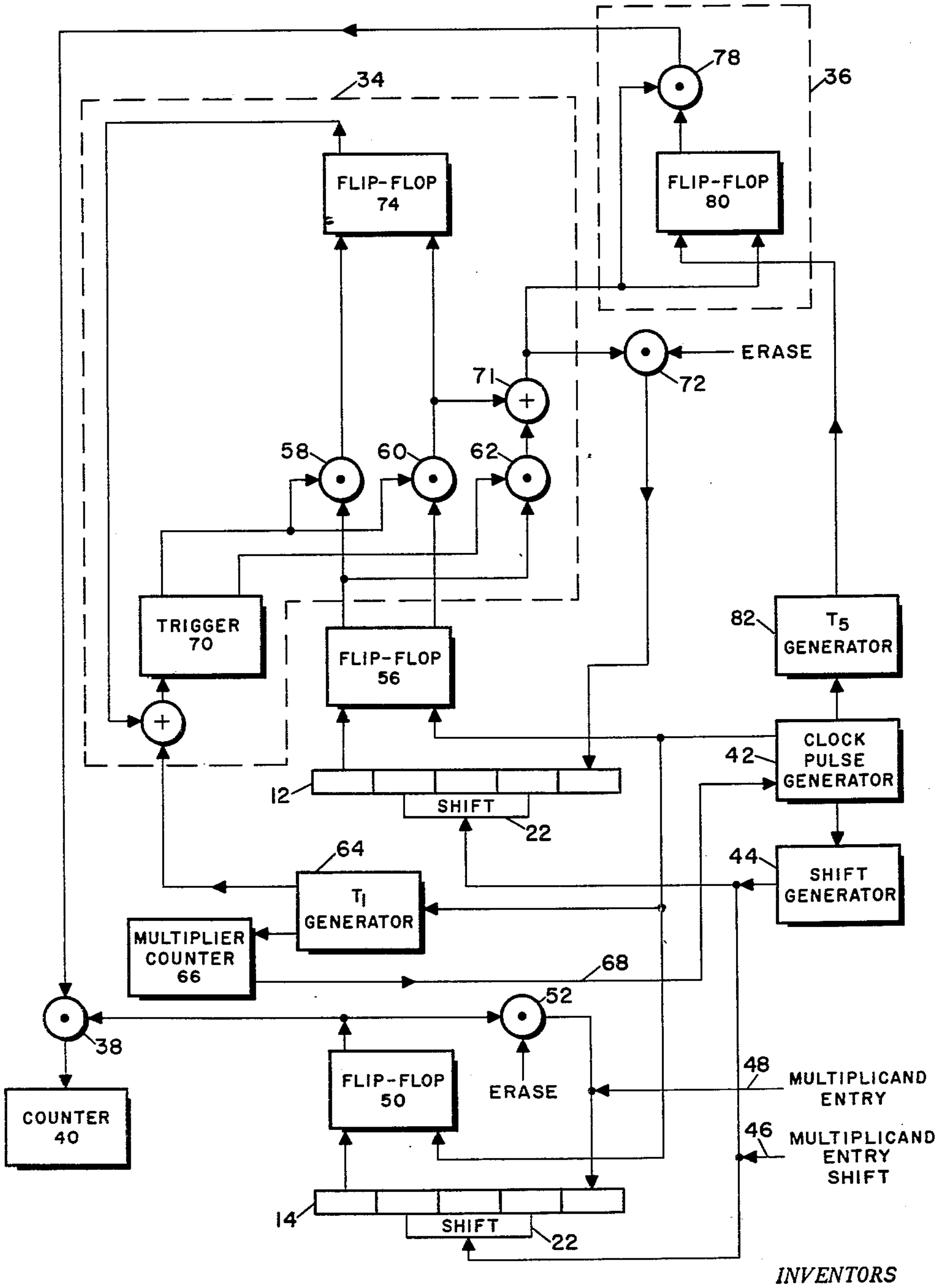
FIGURE 3 is a block diagram of the logical circuitry of the preferred embodiment of the invention.

The preferred embodiment of the invention makes use of serial recirculating registers 10 of the type shown in FIGURE 2. The registers employ a plurality of magnetic rings 16 which are equal in number to the binary digit capacity of the storage register. Throughout the following description a five bit storage register will be used for illustrative purposes. It is to be understood that any size storage register might be used, the capacity of the register being dependent upon the nature of the quantity to be multiplied and the accuracy to which the multiplication is to be performed.

Each of the rings 16 has three windings on it, an input winding 18, an output winding 20 and a shift winding 22. The output winding 20 of each particular ring is connected to the input winding 18 of the succeeding ring in the chain by means of a circuit which includes a diode 24 which is disposed in series with the connecting circuit and a capacitor 26 which shunts both of the coils. All of the shift coils 22 are connected in series.

Information is entered into the register through the input terminals 28 in the form of positive pulses. The direction of the pulse is such as to magnetize the first ring 16 in what will be termed a positive direction. Before a second bit of information is entered into the register the first bit must be moved from the first ring 16 to the second ring. This is accomplished by introducing a pulse to the shift coil 22. The shift pulse is in a direction as to cause the ring 16 to be magnetized in a negative direction.

The magnetic characteristics of the ring 16 are such that when the pulse which is initially applied to the terminals 28 is removed the ring will retain a residual magnetism which is only slightly less than that which was developed while the pulse was on. When the later shift pulse is applied to the coil 22 the magnetic level of the ring switches to what may be termed a negative magnetic level. This change in magnetization, $\Delta B$, results in a voltage being generated in the output coil 20. The voltage charges the capacitor 26 which is shunted across the coil 20. As soon as the shifting pulse is removed from the coils 22 the capacitor 26 discharges through the input coil 18 of the next ring 16. This discharge is in such a direction as to charge the second ring 16 to a positive magnetization level. The diode 24 prevents the discharge of the capacitor 26 from acting on the output coil 20 which originally induced the charge on the capacitor 26.

Subsequent pulses on the shift coil 22 will shift a signal from the second ring 16 to the third ring and so on until it appears at the output terminals 30. If no input signal is applied to the terminals 28 prior to the application of a shift pulse to coils 22 the first ring 16 is not magnetized and a subsequent magnetization pulse by the shift coil 22 will not cause a current to charge the adjacent condenser 26. Therefore, no signal will be passed on to the subsequent coil.

It is, therefore, seen that after a number of shift pulses equal to the number of cores present in the register a signal which has been initially applied to the input terminals 28 will appear at the output terminals 30 and the other rings 16 will either be magnetized or unmagnetized depending upon whether an input signal has been applied to the terminals 28 at a particular previous time.

Recirculating registers are employed to store both the multiplier and multiplicand. Throughout the following description the input quantity which is coded in binary form will be referred to as the multiplicand while the input quantity which appears as a train of pulses will be referred to as the multiplier.

Referring to FIGURE 1 the multiplier train of pulses is entered into the register 12 through an adder 34 while the multiplicand code is entered into the register 14. Both the multiplicand register 14 and the multiplier register 12 are so oriented that a pulse applied to their right hand input will be shifted toward their left hand outputs by subsequent shift pulses.

The circuit is initially conditioned for multiplication by inserting the multiplicand, which is provided in binary form, into the shift register 14. This is done by either providing a signal at the multiplicand input or not providing any signal, depending upon whether the binary digit to be entered is a one or zero, and simultaneously energizing the shift coil. This is performed sequentially for each of the digits in the binary number, the most significant digit in the number being entered first and the least significant digit last.

When the multiplicand has been completed entered into the register 14, the circuit is prepared for multiplication.

A series of regular pulses are then applied to the shift coils of both the registers 12 and 14 simultaneously. Once every five shift pulses a multiplier pulse is entered into the multiplier adder 34. The adder 34 performs the function of adding the multiplier pulses into the recirculating train of pulses in the multiplier register in a binary manner. That is, if there are no pulses recirculating in the register 12 and one multiplier pulse is generated the adder 34 will insert that pulse into the multiplier train in the least significant position in the train, which is the position that emerges from the multiplier register 12 simultaneously with the emergence of the most significant digit from the multiplicand register 14. However, if a one already occupies the least significant position in the multiplier train when a multiplier input pulse is generated, the adder will place a zero in the least significant position, and provide a pulse or a "one" signal for the next significant position. Similarly, if a one occupies the lowest two significant figures the adder will supplant the zeros in both of these positions and generate a one for the third significant place.

Its logical function is, therefore, seen to be as follows: when a multiplier input pulse is received it retains that pulse until the lowest significant place in the register train, which contains a zero, is emitted from the multiplier register 12. It then places a one in that position, having in the meantime generated zeroes in all less significant positions.

The non-carry pulse detector 36 senses when the multiplier pulse has been added into the train, that is, the first period in a given recirculation cycle in which no carry pulse has been generated in the adder. The non-carry detector then generates a pulse which is fed to the "and" gate 38.

If a "one" or high signal is leaving the multiplicand register 14 at the same instant as the non-carry is generated, the other input to the "and" gate 38 is high and a pulse will be passed to the product counter 40, which may be a binary counter.

After a number of multiplier pulses equal to the value of the multiplier number have been fed into the adder 34, the product of the multiplier number and the multiplicand number will appear in the product counter 40.

This is shown by the chart of FIGURE 4. Each series of five shift pulses is termed a "recirculation" since in that number of shifts a binary number is carried through all of the stages of the register and through the output system and returns to its starting point. Additionally, the individual shifts contained in one recirculation are termed $T_1$, $T_2$, $T_3$, $T_4$ and $T_5$, the subscript referring to the pulse number within a particular recirculation cycle.

In the chart of FIGURE 4 the shift time at which a non-carry pulse occurs is indicated for 16 recirculations. This example is, therefore, apropos for a multiplier 16.

As shown in the top half of FIGURE 4, on the first recirculation the multiplier pulse is added into the recirculation register 12 at $T_1$ since the register is initially empty. However, in the second recirculation although the pulse is fed into the adder at $T_1$ it does not enter the recirculation register until $T_2$ since a one is initially in the $T_1$ position. This operation also changes the one in the $T_1$ position to a zero so that the multiplier pulse, which is applied during the third recirculation, may be entered into the $T_1$ position. During the fourth recirculation both the $T_1$ and $T_2$ positions are occupied so that the multiplier pulse has the effect of converting the one in these two positions to zeros and entering a one in the $T_3$ position, causing a non-carry pulse to be generated at that time. The position of the non-carry pulses for the remainder of the 16 positions may be determined in a similar manner.

From a study of the upper half of the chart of FIGURE 4 it is apparent that a non-carrying pulse is produced in $T_1$ on every second recirculation, a pulse is produced on $T_2$ on every fourth recirculation, a pulse is produced at $T_3$ on every eighth recirculation, a pulse on $T_4$ on every sixteenth recirculation and a pulse on $T_5$ on every thirty-second recirculation. Thus, in N recirculations the output pulses which occur during $T_1$ are equal to $$\frac{N}{2}$$

the output pulses which occur during $T_2$ are equal to $$\frac{N}{4}$$

and the outputs of the other lines are similarly proportioned.

It may be recognized that the output during any particular pulse time $T_A$ is equal to $$\frac{N}{2^A}$$

and that this number of pulses is distributed over the total of recirculation times in a roughly linear manner.

A multiplicand of .625 has also been assumed for purposes of the example. The equivalent binary representation of .625 is .10100. This number is, therefore, entered into the multiplicand register with the most significant digit entered first.

As has been noted, when a non-carry pulse occurs at the same time as a "one" exists from the last position of the multiplicand register an output pulse is produced. Since the number 10100 was entered in the multiplicand register, an output pulse is produced whenever a non-carry pulse occurs on either the first or the third shift pulse cycle, $T_1$ or $T_3$. Therefore, the total number of pulses on the output line is equal to the sum of the non-carry pulses produced during $T_1$ and $T_3$ during N recirculations. As shown, during 16 recirculations pulses appear on $T_1$ and $T_3$ a total of 10 times; the product of 16 and .625. These 10 pulses are distributed over the 16 recirculation cycles in a linear manner.

Although the product of 16 and .625 comes out exact, the product would only be approximate for most multiplier values. For example, if the multiplier was 7, the pulse output obtained would be 5 after 7 recirculation cycles as shown in FIGURE 4. Since the exact product of 7 and .625 is 4.375, the product output of 5 pulses is approximate. By increasing the number of stages in the registers 12 and 14, multiplicands with a greater number of places can be inserted into the register 14 thereby permitting use of the multiplier to obtain higher place accuracy. This would increase the number of shifts necessary to complete a recirculation.

The logical circuitry which is employed in the preferred embodiment of the device is illustrated in FIGURE 3.

A clock pulse generator 42 provides the synchronizing signals for the entire system. One output of the clock generator 42 is fed to a shift delay generator 44 which provides a series of pulses which are delayed with respect to the clock pulses by some fraction of a clock period. This shift generator connects directly to the shift coils 22 of both the recirculating registers 12 and 14.

Another input line 46 allows the multiplicand register 14 to be shifted at will so that a multiplicand may be initially entered into the register through input line 48. The line 48 connects to the first stage of the register 14 which is so constructed as to shift data from its right input to a left output. The multiplicand is initially placed in the register by placing a signal or no signal upon line 48 depending upon whether the digit to be entered is a zero or a one and simultaneously energizing the line 46 to shift the pulses. This process is performed sequentially until the entire multiplicand has been entered into the register 14 with the most significant digit entered first and the least significant digit entered last.

The reigister 14 has an output to the left input of a bistable multivibrator 50, which has its other input connected to the clock generator 42. Thus, each time a "one" emerges from the last stage of the multiplicand register 14 an output pulse appears at the output of the multi-stable vibrator 50, the output pulse having a length equal to the difference in time between the occurrence of a shift pulse and the occurrence of the next clock pulse.

These pulse signals are fed to one input of the "and" gate 38. The output of the multivibrator 50 also returns to the input of the multiplicand register 14 via an "and" gate 52 which has an erasing connection 54 as its other input. In order to erase the data in the multiplicand register the shift coil 22 is energized a number of times and the erasing input 54 to the "and" gate 50 is maintained in an off condition.

The last core of the shift register 12 has an output to another bistable multivibrator 56 which has a second input from the clock pulse generator 42. Therefore, each time a "one" is shifted out of the register 12 the bistable multivibrator 56 emits a pulse on its left output line which is equal in length to the time differential between a shift pulse and the succeeding clock pulse. During such times as the pulse output appears on it left output line the right output of the multivibrator 56 is "low." At all other times the right output is "high."

The left output of the mulivibrator 56 is connected to inputs of two "and" gates 58 and 62 in the adder circuitry 34. The right output of the multivibrator 56 connects to a third "and" gate 60.

Multiplier pulses are added into the circuit 34 through a pulse generator 64 which has an input from the clock pulse generator 42 and is so constructed as to generate a pulse upon reception of the first clock pulse and each fifth clock pulse thereafter. This generator 64 is, therefore, denominated a $T_1$ generator since it issues a pulse at the first clock period in each recirculation cycle.

The $T_1$ generator provides input to a preset counter 66. The counter 66 is initially set with a number equal to the multiplier to be used in a particular problem. Each time a $T_1$ pulse is generated the counter subtracts another number until it has reached a zero value at which time it opens a set of contacts which act through line 68 to de-energize the clock pulse generator 42.

The $T_1$ generator 64 also connects to a Schmitt trigger 70 which has the property of causing its left output to be high when the signal on its input line is above a predetermined value and making its right output high when the signal on its input line falls below that predetermined value. The right or high output of the trigger 70 connects to the second input of the "and" gate 62 while the left, or low, output of the trigger 70 connects to the "and" gates 58 and 60. The trigger 70 performs the function of providing an indication of when no pulse is added in. Therefore, whenever a $T_1$ pulse is generated the left output of the trigger is high and at all other times the right output of the trigger 70 is high.

It is seen that the output of the "and" gate 58 is high whenever a $T_1$ pulse is being added in and a "one" is simultaneously emerging from the last state of the multiplier register 12; the "and" gate 60 is high whenever a $T_1$ pulse is being added into the circuit and a "zero" is emerging from the last stage of the multiplier register 12; and the "and" gate 62 is high whenever a "one" is emerging from the last stage of the multiplier register 12 and no $T_1$ pulse is simultaneously generated.

In the binary addition a one plus a zero is equal to one; therefore, whenever either a multiplier pulse or a register pulse occurs alone a one must be fed back to the first stage of the register. This is accomplished by an "or" gate 71 which sums the outputs of gates 60 and 62 and feeds back to the input of the shifting register 12 through an erasing gate 72. On the other hand, when both a multiplier pulse and an output from the register occur simultaneously a zero or no signal must be generated and a one must be carried over to add into the next most significant stage of the register train. This is accomplished by a bistable multivibrator 74 which receives the output of the "and" gate 58. The left or high output of the multivibrator feeds back into the input of the trigger 70, thereby creating the equivalent of the multiplier pulse in the next shift cycle. The right input to the multivibrator 74 stops the pulse from the output whenever gate 60 is conducting, indicating that the feedback pulse has been admitted to the first stage of the register.

The output of the "or" gate 71 which indicates that a pulse has been re-admitted to the first stage of the register 12 also connects to an "and" gate 78 which has as its other input the output of a bistable multivibrator 80. The multivibrator 80 has its high or left input from a pulse generator 82 which has an input from the clock pulse generator 42. The generator 82 is of such construction as to emit a pulse on the fifth pulse from the generator 42 and on each fifth succeeding pulse and is denominated the $T_5$ generator.

It, therefore, makes the output of the multivibrator 80 high following the last pulse in a recirculation cycle, thereby opening the gate 78. When a pulse output appears at gate 71 it is fed to the right input of the multivibrator 80 closing off the output. This same pulse which closes the output feeds to the "and" gate 78 and generates an output pulse from that gate. The circuitry of the non-carry pulse detector 36 is, therefore, such that only one pulse is generated at its output during any given recirculation cycle and that pulse coincides with the input of the first pulse to the recirculation register during that cycle. It is seen that this pulse also coincides with the first time in any recirculation cycle in which no carry pulse is generated by the multivibrator 74.

From the previous explanation of FIGURE 1 it has been seen that whenever a non-carry pulse is emitted from "and" gate 78 and a "one" simultaneously emerges from the multiplicand register 14, the "and" gate 38 is made high and an output pulse is fed to the counter 40.

After a number of $T_1$ pulses which is equal to the multiplier number in a particular problem has been added into the multiplier register, the preset counter 66 de-energizes the clock pulse generator 42. At that time the number appearing in the counter 40 represents the product of the multiplier and the multiplicand.

In order to prepare this circuitry for the next operation, both registers must be cleared. This is done by energizing the shift coils 22 a number of times while the erase gates 52 and 72 are maintained in off position by their erasing inputs.

It is thus seen that the circuitry of the present invention provides a device for multiplying two quantities which is extremely simple in construction and operation and which provides as an output a number of pulses distributed over the time period of the multiplication.

Having thus described our invention, we claim:

1. A digital multiplier unit comprising: a first serial recirculating register; a second serial recirculating register; a serial adder having a first input connected to the output of said first serial recirculating register, a second input, and an output to the input of said first serial recirculating register, and being operative to provide a carry pulse at such times as pulses appear simultaneously on both of its inputs; means for inserting a first binary number to be multiplied into said second serial recirculating register in such a manner that the digits emerge from said register in order of descending significance; means for simultaneously shifting the contents of said first and said second registers; means for applying a pulse to the second input of said serial adder simultaneously with the emergence of the digit of highest significance from said serial second recirculating register, the total number of pulses so added being equal to the second number to be multiplied; means for providing a pulse in the first shift period following the addition of a pulse to said serial adder in which no carry pulse is generated by said serial adder; and means for providing an output pulse from said multiplier when such non-carry pulse occurs simultaneously with the emergence of a "one" from said second serial recirculating register, the sum of said output pulses being approximately equal to the product of the two numbers being multiplied.

2. A digital multiplier unit comprising: a first serial recirculating register; a second serial recirculating register; a serial adder having first input connected to the output of said first serial recirculating register, a second input, and an output to the input of said first serial recirculating register, and being operative to provide a carry pulse at such times as pulses appear simultaneously on both of its inputs; means for inserting a first binary number to be multiplied into said second recirculating register; means for simultaneously shifting the contents of said first and said second registers; means for applying a pulse to the second input of said serial adder simultaneously with the emergence of the digit of highest significance from said second serial recirculating register, the total number of pulses so added being equal to the second number to be multiplied; means for providing a non-carry pulse in the first shift period following the addition of a pulse to said serial adder during which no carry pulse is generated by said serial adder; and means for providing an output pulse from said multiplier when said non-carry pulse occurs simultaneously with the emergence of a one from said second serial recirculating register, the sum of said output pulses being approximately equal to the product of the two numbers being multiplied.

3. A digital multiplier unit comprising: a first serial recirculating register; a second serial recirculating register, a serial adder having a first input connected to the output of said first serial recirculating register, a second input, and an output connected to the input of said first serial recirculating register, and being operative to provide a carry pulse at such times as pulses appear simultaneously on both of its inputs; means for inserting a first binary number to be multiplied into said second recirculating register; means for simultaneously shifting the contents of said first and said second registers; means for applying a pulse to the second input of said serial adder simultaneously with the emergence of the digit of highest significance from said second serial recirculating register, the total number of pulses so added being equal to the second number to be multiplied; means for providing a non-carry pulse in the first shift period following the addition of a pulse to said serial adder during which no carry pulse is generated by said serial adder; and an "and" gate having a first input from the output of said second serial recirculating register and having a second input connected to the source of non-carry pulses, whereby an output from said "and" gate is provided when a "one" emerges from said second recirculating register simultaneously with the generation of a non-carry pulse, the sum of pulse outputs from said "and" gate being approximately equal to the product of the first and second numbers to be multiplied.

4. A digital multiplier unit comprising: a first serial recirculating register; a second serial recirculating register; a serial adder having a first input connected to the output of said first serial recirculating register, a second input, and an output connected to the input of said first serial recirculating register, and being operative to provide a carry pulse at such times as pulses appear simultaneously on both of its inputs; means for inserting a first binary number to be multiplied into said second recirculating register; means for simultaneously shifting the contents of said first and said second registers; means for applying a pulse to the second input of said serial adder simultaneously with the emergence of the digit of highest significance from said second serial recirculating register, the total number of pulses so added being proportional to the second number to be multiplied; means for providing a non-carry pulse in the first shift period following the addition of said pulse to said serial adder during which no carry pulse is generated by said serial adder; and an "and" gate having a first input from the output of said second serial recirculating register and having a second input connected to the source of non-carry pulses, whereby an output from said "and" gate is provided when a one emerges from said second recirculating register simultaneously with the generation of a non-carry pulse, the sum of said pulse outputs from said "and" gate being approximately proportional to the product of the first and second numbers to be multiplied.

5. A digital multiplier unit comprising: a first serial recirculating register, an "and" gate having first and second inputs, the first input being connected to the output of the first register, a second serial recirculating register, an adder having first and second inputs and first and second outputs, the first input and the first output of the adder being connected respectively to the output and the input of the second register, the second output of the adder being connected to the second input of the "and" gate, means for inserting a first number to be multiplied into the first register, means for recirculating the registers a number of times proportional to the second number to be multiplied, and means for introducing a pulse to the second input of the adder during each recirculation of the registers, the adder being operative to generate a pulse on its second output during each recirculation of the register upon the introduction of the pulse to its second input and the first introduction of a zero input to its first input from the second register.

6. A digital multiplier unit as recited in claim 5 wherein the registers are recirculated a number of times equal to the second number to be multiplied.

References Cited in the file of this patent

UNITED STATES PATENTS 2,749,037 Stibitz ---------------- June 5, 1956

OTHER REFERENCES

"Special-Purpose Digital Data-Processing Computers," by B. M. Gordon and R. N. Nicola, published in Proceedings of the Association for Computing Machinery, May 1952, pp. 41 and 42 (FIGS. 8 and 9) relied upon.

"An Operational-Digital Feedback Divider," by M. A. Meyer, B. M. Gordon and R. N. Nicola, published in Transactions of the I.R.E. Professional Group on Electronic Computers, March 1954, page 18 (FIG. 2) relied upon.

"Digital Techniques in Analog Systems," by M. A. Meyer, published in Transactions of the I.R.E. Professional Group on Electronic Computers, June 1954, pp. 25 and 26 (FIGS. 2 and 4) relied upon.